United States Patent
Pan et al.

(10) Patent No.: US 6,748,231 B2
(45) Date of Patent: Jun. 8, 2004

(54) METHOD AND APPARATUS FOR CONTROLLING POWER DURING A DISPATCH GROUP CALL

(75) Inventors: Shao Wei Pan, Lake Zurich, IL (US); Frank Zhou, Arlington Heights, IL (US); Hechun Cai, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 177 days.

(21) Appl. No.: 09/944,468

(22) Filed: Aug. 31, 2001

(65) Prior Publication Data

US 2003/0045317 A1 Mar. 6, 2003

(51) Int. Cl.$^7$ ................................................ H04B 1/00
(52) U.S. Cl. ..................... 455/518; 455/69; 455/522; 455/509; 370/335; 370/342
(58) Field of Search .......................... 455/522, 69, 518, 455/509; 370/335, 342

(56) References Cited

U.S. PATENT DOCUMENTS

| | | | |
|---|---|---|---|
| 5,634,197 A | * | 5/1997 | Paavonen .................... 455/512 |
| 5,881,368 A | * | 3/1999 | Grob et al. .................... 455/69 |
| 5,983,099 A | | 11/1999 | Yao et al. .................... 455/426 |
| 6,178,166 B1 | | 1/2001 | Wilson et al. .............. 370/335 |
| 6,233,461 B1 | * | 5/2001 | Chinitz et al. .............. 455/522 |

FOREIGN PATENT DOCUMENTS

WO    WO 99/12275    3/1999

OTHER PUBLICATIONS

PCT International Search Report issued in PCT/US 02/22177, Sep. 25, 2002.

* cited by examiner

Primary Examiner—Nay Maung
Assistant Examiner—Alan T. Gantt
(74) Attorney, Agent, or Firm—Marshall, Gerstein & Borun, LLP

(57) ABSTRACT

Preferred embodiments of a method and an apparatus for controlling power during a dispatch group call in a wireless communication system are described. A base station (142) monitors for a transmission from a plurality of mobile stations (270) via a first communication resource during a time period. The base station (142) adjusts transmission power associated with a second communication resource based on the transmission from the plurality of mobile stations (270) via the first communication resource. Further, the base station (142) determines whether the transmission power associated with the second communication resource is above a transmission power threshold. In response to a failure to receive the transmission from the plurality of mobile stations (270) via the first communication resource during the time period and a failure to detect the transmission power associated with the second communication resource being above the power threshold, the base station (142) terminates transmissions to the plurality of mobile stations (270) via the second communication resource.

38 Claims, 2 Drawing Sheets

400

METHOD AND APPARATUS FOR CONTROLLING POWER DURING A DISPATCH GROUP CALL

FIELD OF THE INVENTION

The present invention relates generally to wireless communication systems, and more particularly, to a method and an apparatus for controlling power during a dispatch group call.

BACKGROUND OF THE INVENTION

A wireless communication system is a complex network of systems and elements. Typical elements include (1) a radio link to the mobile stations (e.g., cellular telephones), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a call controller or switch, typically a call agent (i.e., a "softswitch"), for routing calls within the system, and (5) a link to the land line or public switch telephone network (PSTN), which is usually also provided by the call agent.

Wireless communication systems typically provide point-to-point service such that a one-to-one correspondence exists between a mobile station that transmits a signal (i.e., talk) and a mobile station that receives the signal (i.e., listen). In contrast, a dispatch system such as, but not limited to, a police radio system and a taxi system, provides a one-to-many correspondence between a mobile station that transmits a signal and a number of mobile stations that receive the signal. During a dispatch group call, an entire group of mobile stations "listen" to the same forward link signal, and a majority of the mobile stations are in a "passive" mode (i.e., listening) while only one mobile station is in an "active" mode (i.e., talking) at any one time. Information such as a voice and/or data transmission from the mobile stations flow to the base station via a reverse traffic channel. For example, a user of a mobile station may activate the "talk" function by selecting or pressing a "push-to-talk" (PTT) button on the mobile station. Accordingly, the voice or data transmission from the mobile station of the user is communicated on a reverse traffic channel to the base station for transmission on a forward broadcast channel to the other mobile stations listening to the dispatch group call.

One aspect of designing a communication system is to maximize the capacity of the system in terms of the number of calls that can be handled simultaneously. The capacity of the system can be maximized when the transmission power of each mobile station is controlled so that each signal transmitted by the mobile stations arrives at a base station servicing those mobile stations at approximately the same power level. In contrast, when a signal transmitted by a mobile station arrives at the base station at a power level that is too low in comparison to the power level of other mobile stations serviced by the base station, the bit error rate (BER) may be too high to permit high quality communication because of interference from the other mobile stations. When a signal transmitted by the mobile station arrives at the base station at a power level that is too high in comparison to the power level of other mobile stations serviced by the base station, communication with this particular mobile station is acceptable but this high power signal acts as interference to the other mobile stations.

As in most wireless communication systems, transmission from a base station on the forward broadcast channel may be too weak in some parts of a coverage area for a mobile station to achieve high quality communication with the base station. Typically, the transmission becomes weaker as the mobile station moves farther away from the base station. Another example may be a location where the path loss of one or two neighboring base station(s) is approximately the same as the path loss of the base station in communication with the mobile station. As a result, transmission power needs to be increased to avoid poor quality in the transmission from the base station on the forward broadcast channel. In addition, interference from other neighboring base stations may require additional power to service the mobile station adequately. In contrast, the mobile station may be in a part of the coverage area where the signal-to-interference ratio (SIR) is unusually favorable for the mobile station. As a result, the base station may transmit on the forward broadcast channel using a lower than normal transmission power so that interference to other transmission in the system may be reduced. Therefore, a need exist to maximize capacity of a communication system by controlling transmission power of each mobile station within the coverage area serviced by the base station.

DETAILED DESCRIPTION OF THE PREFERRED EMBODIMENTS

Figure 1:
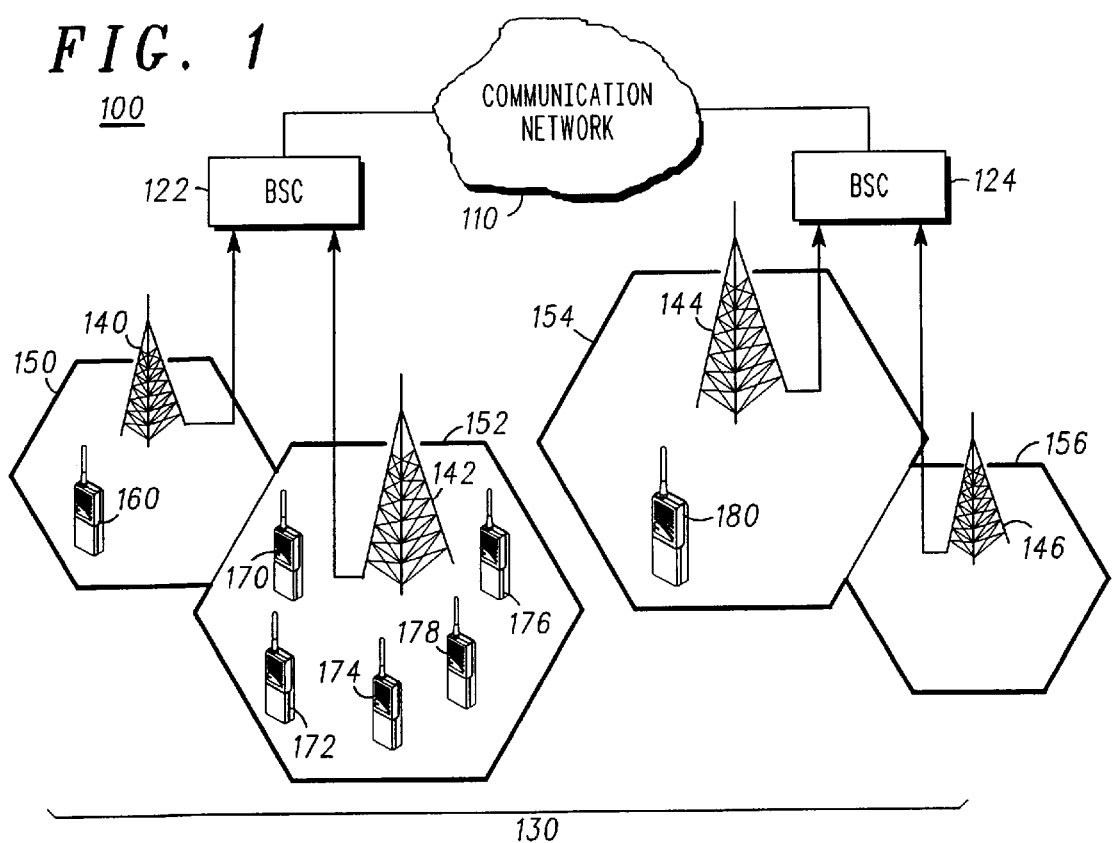
FIG. 1 is a block diagram representation of a wireless communication system that may be adapted to operate in accordance with the preferred embodiments of the present invention.

Preferred embodiments of a method and an apparatus for controlling power during a dispatch group call in a wireless communication system are described. A wireless communication system, such as a code division multiple access (CDMA) based system, generally includes at least one base station and a plurality of mobile stations. The base station provides communication services to the plurality of mobile stations over a number of communication channels. In addition to the voice or data information being communicated on the communication channel, signaling and control information is also communicated. Each communication channel includes a forward link for communications from the base station to the mobile station and a reverse link (i.e., a reverse channel) for communication from the mobile station to the base station. The reverse channel may include, but not limited to, a reverse power request channel and a reverse traffic channel.

During a dispatch group call, a base station communicates with a plurality of mobile stations. The base station monitors for a transmission from the plurality of mobile stations on the reverse channel for a time period. The transmission from the plurality of mobile stations via the reverse channel may be, but is not limited to, a power request transmission, a voice transmission and/or a data transmission via the reverse channel.

In response to receipt of a power request transmission from one of the plurality of mobile stations, the base station adjusts transmission power associated with the forward broadcast channel. For example, the power request transmission may be a power increase request access message (PIRAM) from the mobile station with the highest power requirement of the plurality of mobile stations, i.e., the base station issues an "individual" token to this mobile station with the highest power requirement to permit this mobile station to transmit the PIRAM. Accordingly, the base station adjusts transmission power associated with the forward broadcast channel based on the PIRAM. If the base station does not receive a PIRAM from the mobile station with the highest power requirement of the plurality mobile stations, the base station monitors for a PIRAM from the mobile station with the second highest power requirement of the plurality of mobile stations, i.e., the base station passes the "individual" token from the mobile station with the highest power requirement to the mobile station with the second highest power requirement. As a result, the base station continues to monitor for a PIRAM from the rest of the plurality of mobile stations until the base station fails to receive a PIRAM from any one of the plurality of mobile stations.

If the base station does not receive a power request transmission from any one of the plurality of mobile stations during the time period, the base station reduces transmission power associated with the forward broadcast channel by a predetermined value and determines whether transmission power associated with the forward broadcast channel is above a transmission power threshold. In response to the transmission power associated with the forward broadcast channel being at the transmission power threshold, the base station may terminate transmissions to the plurality of mobile stations via the forward broadcast channel. In particular, with the transmission power being at the threshold, the base station terminates transmission to the plurality of mobile stations via the forward broadcast channel in response to a lack of activity on the reverse channel. That is, a failure to receive either a voice transmission or a data transmission from the plurality of mobile stations via the reverse traffic channel and a failure to receive a power request transmission vie the reverse power request channel during the time period. As a result, the base station controls transmission power during a dispatch group call based on transmissions from the plurality of mobile stations.

In an alternate embodiment, the base station may provide service to a coverage area with a sizeable number of mobile stations. Thus, the base station may separate the plurality of mobile stations into different groups to accelerate the process of controlling transmission power of the forward broadcast channel. In particular, the plurality of mobile stations are separated into groups based on the power requirements of the mobile stations. Similar to determining which one of the plurality of mobile stations requires the highest amount of transmission power as described above, the base station determines which one of the groups of the plurality of mobile stations requires additional power based on the power requirements of the mobile stations within the groups. Accordingly, the base station provides a group of mobile stations with a "group" token that permits mobile stations within that particular group to transmit a power request transmission via the reverse power request channel for additional power.

The present invention is described in terms of several preferred embodiments, and particularly, in terms of a wireless communication system operating in accordance with at least one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, CDMA 2000, the Personal Communications System (PCS), 3G and variations and evolutions of these protocols. As shown in FIG. 1, a wireless communication system 100 includes a communication network 110, and a plurality of base station controllers (BSC), generally shown as 122 and 124, servicing a total service area 130. The wireless communication system 100 may be on any one or more of the foregoing system protocols. As is known for such systems, each BSC 122 and 124 has associated therewith a plurality of base stations (BS), generally shown as 140, 142, 144, and 146, servicing communication cells, generally shown as 150, 152, 154 and 156, within the total service area 130. The BSCs 122 and 124, and base stations 140, 142, 144 and 146 are specified and operate in accordance with the applicable standard or standards for providing wireless communication services to mobile stations (MS), generally shown as 160, 170, 172, 174, 176, 178 and 180 operating in communication cells 150, 152, 154 and 156, and each of these elements are commercially available from Motorola, Inc. of Schaumburg, Ill.

Figure 2:
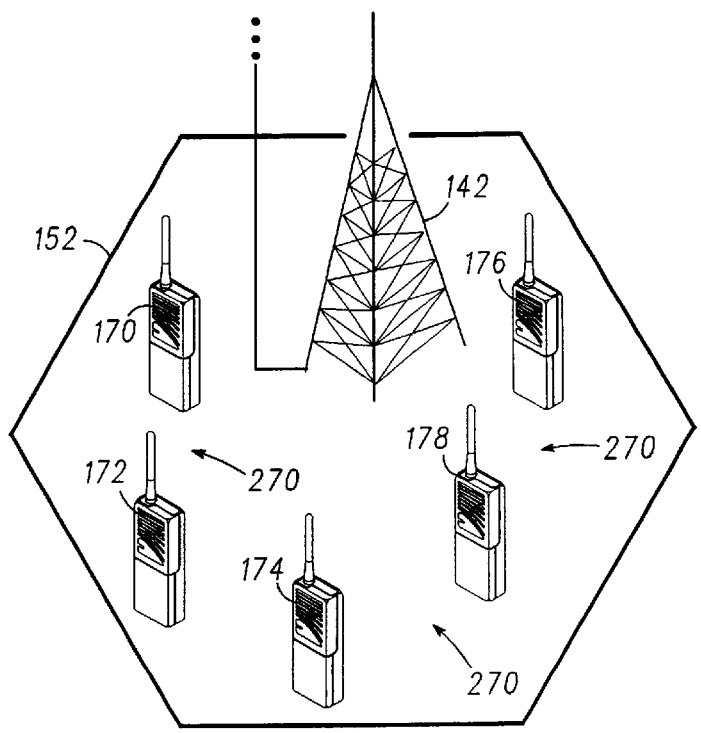
FIG. 2 is a block diagram representation of a communication cell that may be adapted to operate in accordance with the preferred embodiments of the present invention.

Referring to FIG. 2, the communication cell 152 generally includes the base station 142 and a plurality of mobile stations 270, generally shown as 170, 172, 174, 176 and 178. The base station 142 provides communication service to the plurality of mobile stations 270 within the communication cell 152 (i.e., the coverage area). In particular, the plurality of mobile stations 270 communicate with the base station 142 via a first communication resource such as a reverse channel. The reverse channel may include, but not limited to, a reverse power request access channel and a reverse traffic channel. For example, one of the plurality of mobile stations 270 may transmit a power request transmission via the reverse power request access channel. Further, the plurality of mobile stations 270 may transmit either a voice transmission or a data transmission via the reverse traffic channel. The base station 142 communicates with the plurality of mobile stations 270 via a second communication resource, which may be, but is not limited to, a forward broadcast channel. During a group dispatch call, one of the plurality of mobile stations 270 is an active mode (i.e., "talking") to provide transmission via the reverse channel to the base station 142, which in turn, transmits via the forward broadcast channel. Accordingly, the rest of the plurality of mobile stations 270 are in a passive mode (i.e., "listening") to receive a transmission via the forward broadcast channel from the base station 142. For example, when the mobile station 170 is "talking" via the reverse traffic channel, the rest of the plurality of mobile stations 172, 174, 176 and 178 are "listening" via the forward broadcast channel.

A basic flow for controlling power during a dispatch group call that may be applied with the preferred embodiment of the present invention shown in FIG. 2 may start with the base station 142 monitoring for a transmission from the plurality of mobile stations 270 via the first communication resource for a time period. The transmission from the plurality of mobile stations 270 may be, but is not limited to, a power request transmission, a voice transmission and/or a data transmission. In response to receipt of a power request transmission from one of the plurality of mobile stations 270 via the reverse power request channel, the base station 142 adjusts transmission power associated with the second communication resource (e.g., the forward broadcast channel) based on the power request transmission. In particular, the power request transmission may be, but is not limited to, a power increase request access message (PIRAM) that provides the base station 142 with a power increase level in which to adjust transmission power associated with the forward broadcast channel. The power increase level may be, but is not limited to, a two step-sizes 2Δ (e.g., 1 dB) and a one step-size Δ (e.g., 0.5 dB). For example, if the base station 142 receives a PIRAM with a power increase level of Δ, the base station 142 increases transmission power associated with the forward broadcast channel by a power increase level of Δ. In contrast, if the base station 142 receives a PIRAM with a power increase level of 2Δ (i.e., the current PIRAM), the base station 142 determines whether transmission power associated with the forward broadcast channel was adjusted by a power increase level of 2Δ from the prior PRAM. In which case, the base station 142 adjusts transmission power associated with the forward broadcast channel by a power increase level of Δ rather than 2Δ to avoid a possibility of over-aggressive power increase. Otherwise, the base station 142 adjusts transmission power associated with the forward broadcast channel based on the current PIRAM (i.e., increase by a power increase level of 2Δ) in response to the forward broadcast channel not being adjusted by a power increase level of 2Δ from the prior PIRAM.

To avoid collision (i.e., multiple transmissions at about the same time), only one of the plurality of mobile stations 270 may transmit a power request transmission at a time. Accordingly, the base station 142 determines which one of the plurality of mobile stations 270 requires the highest amount of transmission power. That mobile station is permitted to transmit a power request transmission via the reverse power request channel for additional power. For example, the base station 142 may determine that the mobile station 172 requires the highest amount of transmission power (i.e., mobile station 172 may be farthest away from the base station 142). Thus, the base station 142 may provide the mobile station 172 with an "individual" token, which permits the mobile station 172 to transmit a power request transmission for additional power. The base station 142 may adjust transmission power associated with the forward broadcast channel in response to the power request transmission by the mobile station 172. The base station 142 adjusts transmission power associated with the forward broadcast channel based on the power increase level of the power request transmission as described in detail above. In contrast, if the mobile station 172 does not request additional power, then the base station 142 may provide the "individual" token to the mobile station with the second highest transmission power requirement to transmit a power request transmission. The base station 142 may provide the "individual" token to the rest of the plurality of mobile stations 270 (i.e., mobile stations 170, 174, 176 and 178) until all of the plurality of mobile stations 270 within the communication cell 152 are provided with the opportunity to transmit a power request transmission. As described above, the base station 142 controls power during a dispatch group call by adjusting transmission power associated with the forward broadcast channel based on the request from the mobile station with the highest transmission power requirement. Accordingly, the base station 142 provides adequate transmission power associated with the forward broadcast channel to the other mobile stations serviced by the base station 142.

If the base station 142 receives a PIRAM that may be decoded (i.e., no collision) from the group, the base station 142 adjusts the transmission power of the forward broadcast channel based on the PIRAM (i.e., a 2Δ power increase or a Δ power increase as described above). Accordingly, the base station 142 monitors for the next PIRAM from a mobile station within current group. However, if the base station 142 does not receive a PIRAM or detect a collision from the current group for a given time period, the base station 142 provides the next group (i.e., the group with the second highest power requirement) with the "group" token. The process as described above is repeated for all the groups of mobile stations. The base station 142 reduces transmission power associated with the forward broadcast channel by a predetermined value δ in response to a failure to receive a PIRAM.

In a coverage area with a sizeable number of mobile stations, the base station 142 may separate the plurality of mobile stations 270 into different groups to accelerate the process of controlling transmission power of the forward broadcast channel. The base station 142 may separate the plurality of mobile stations 270 into groups based on the power requirement of the mobile stations, e.g., separated within a 2 dB range. In a similar fashion, the base station 142 may determine which one of groups of mobile stations requires the highest amount of transmission power. That is, the base station 142 may provide a group of mobile stations with a "group" token permitting that particular group of mobile stations to transmit a power request transmission via the reverse power request channel for additional power. At any one time, only the mobile stations within the group with the "group" token are permitted to transmit a power request transmission. However, collision may also occur from the mobile stations within that group transmitting power request transmissions at the same time. As a result, the base station 142 may detect the collision but may not be able to decode the transmissions from the mobile stations. To avoid collision, the base station 142 may further provide an "individual" token to the mobile stations within the group to permit transmission of a power request as described above.

As mentioned above, the base station 142 provides a "token" (i.e., a power request authorization) to permit one of the plurality of mobile stations 270 to transmit a power request transmission for additional power at any one particular time. To determine which one of the plurality of mobile stations 270 is permitted to transmit the power request transmission at a particular time, the base station 142 generates a list stored in a memory of the base station 142, which is further described in detail below (See FIG. 3). The list generated by the base station 142 generally includes a first transmission value and a second transmission value associated with each of the plurality of mobile stations 270. In particular, the first transmission value corresponds to a current transmission from one of the plurality mobile stations 270 and the second transmission value corresponding to a prior transmission from the same mobile station. The first transmission value may be, but is not limited to, a first power request value corresponding to a current power request transmission from one of the plurality of mobile stations 270. Accordingly, the second transmission value may be, but is not limited to, a second power request value corresponding to a prior power request transmission from the same mobile station. Based on the first and second power request values of each of the plurality of mobile stations 270, a linear prediction of the power increase level is determined by the base station 142 so that the token is properly provided the plurality of mobile stations. In particular, the order in which the token is provided to the plurality of mobile stations 270 descends with the amount of transmission power requested. That is, base station 142 begins providing a power request authorization to the mobile station requesting for the highest amount of additional transmission power based on the linear prediction that is determined from the first and second power request values. Accordingly, the last mobile station to be provided with the power request authorization is the mobile station requesting for the least amount of additional transmission power based on the linear prediction that is determined from the first and second power request values.

The transmission power associated with the forward broadcast channel may be adequate for the plurality of mobile stations 270. As a result, the base station 142 may not receive a power request transmission from any of the plurality of mobile stations 270 within the coverage area serviced by the base station 142. In response to a failure to receive a power request transmission from any of the plurality of mobile stations 270, the base station 142 adjusts transmission power associated with the forward broadcast channel to reduce interference associated with the forward broadcast channel. For example, the base station 142 may reduce transmission power associated with the forward broadcast channel by a predetermined value δ.

The base station 142 also determines whether transmission power associated with the forward broadcast channel is above a transmission power threshold. If the forward channel transmission power is above the transmission power threshold, the base station 142 continues to monitor for a power request transmission from one of the plurality of mobile stations 270 via the reverse power request channel. However, if the forward broadcast channel transmission power is no longer above the transmission power threshold (i.e., at or nominally below the threshold due to error in calculation of performance, tolerance, etc.), the base station 142 determines whether the plurality of mobile stations 270 has provided either a voice transmission or a data transmission via the reverse traffic channel and a power request transmission via the reverse power request channel during the time period as noted above. If the plurality of mobile stations 270 did not transmit either a voice transmission or a data transmission via the reverse traffic channel and a power request transmission via the reverse power request channel, the base station 142 terminates transmissions to the plurality of mobile stations 270 on the forward broadcast channel. Terminating the forward broadcast channel to the plurality of mobile stations 270 reduces interference associated with the forward broadcast channel.

Figure 3:
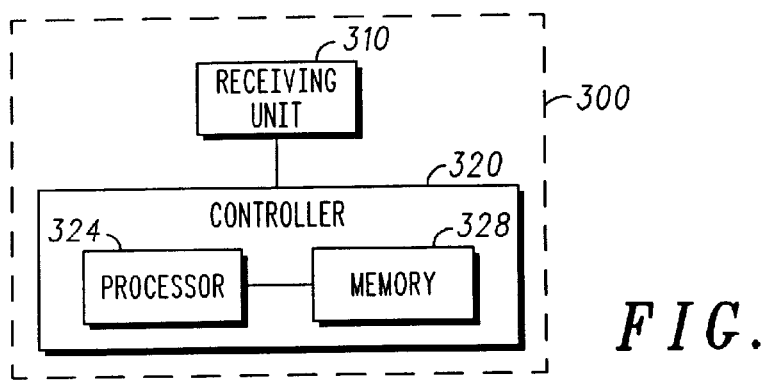
FIG. 3 is a block diagram representation of an apparatus that may be adapted to operate in accordance with the preferred embodiments of the present invention.

As shown in FIG. 3, a base station 300 is adapted in accordance with a preferred embodiment of the invention to control power during a dispatch group call. The base station 300 generally includes a receiving unit 310 and a controller 320. The receiving unit 310 is operatively coupled to the controller 320, which includes, but is not limited to, a processor 324 and a memory 328. The processor 324 is operatively coupled to the memory 328, which stores a program or a set of operating instructions for the processor 324. The processor 324 executes the program or the set of operating instructions such that the base station 300 operates in accordance with a preferred embodiment of the invention. The program or the set of operating instructions may be embodied in a computer-readable medium such as, but not limited to, paper, a programmable gate array, application specific integrated circuit, erasable programmable read only memory, read only memory, random access memory, magnetic media, and optical media.

A basic flow for controlling power during a dispatch group call that may be applied with the preferred embodiment of the present invention shown in FIG. 3 may start with the controller 320 monitoring for transmission from a plurality of mobile stations (shown in FIGS. 1 and 2) via either a reverse power request channel or a reverse traffic channel during a time period. The controller 320 monitors for a transmission such as a power request transmission, a voice transmission, and a data transmission from the plurality of mobile stations via either a reverse power request channel or a reverse traffic channel. In particular, the receiving unit 310 may receive a power request transmission via the reverse power request channel, and a voice transmission and/or a data transmission via the reverse traffic channel. Further, the controller 320 adjusts transmission power associated with a forward broadcast channel based on the power request transmission via the reverse power request channel. For example, the controller 320 may increase transmission power associated with the forward broadcast channel in response to receipt of a power request transmission from one of the plurality of mobile stations via the reverse power request channel. In contrast, if the receiving unit 310 does not receive a power request transmission from any of the plurality of mobile stations within the coverage area serviced by the base station, the controller 320 reduces transmission power associated with the forward broadcast channel by a predetermined value. Accordingly, the controller 320 determines whether the transmission power associated with the forward broadcast channel is above the transmission power threshold (i.e., the transmission power may be nominally below the transmission power threshold due to different factors such as margin of error, etc.). When the transmission power associated with the forward broadcast channel is not above the transmission power threshold, the controller 320 determines whether there were transmissions from the plurality of mobile stations during the time period. If there were no power request transmissions via the reverse power request channel and no voice or data transmissions via the reverse traffic channel during the time period, the controller 320 terminates transmissions to the plurality of mobile stations via the forward broadcast channel.

Figure 4:
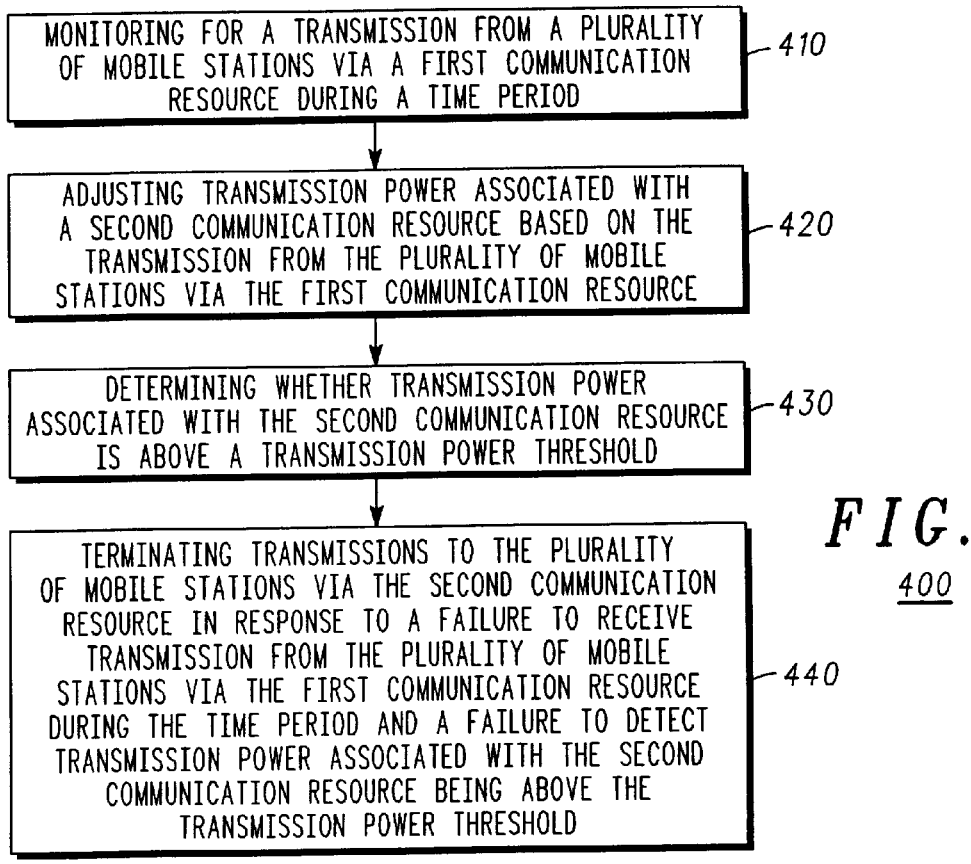
FIG. 4 is a flow diagram illustrating a method for controlling power during a dispatch group call in accordance with the preferred embodiments of the present invention.

In accordance with the preferred embodiments of the present invention, and with references to FIG. 4, a method 400 for controlling power during a dispatch group call is shown. Method 400 begins at step 410, where a base station monitors for a transmission from a plurality of mobile stations via a first communication resource during a time period. The transmission from the plurality of mobile stations may be, but is not limited to, a power request transmission, a voice transmission, and a data transmission. Further, the first communication resource may include, but is not limited to, a reverse power request channel and a reverse traffic channel. The base station receives power request transmissions via the reverse power request channel, and voice transmissions and data transmissions via the reverse traffic channel. At step 420, the base station adjusts transmission power associated with a second communication resource (e.g., a forward broadcast channel) based on a transmission from the plurality of mobile stations via the first communication resource (i.e., the reverse power request channel). In particular, the base station increases the transmission power associated with the forward broadcast channel in response to receipt of a power request transmission from one of the plurality of mobile stations via the reverse power request channel. Further, transmission power associated with the forward broadcast channel is based on the power request transmission. In contrast, if the base station does not receive a power request transmission from any of the plurality of mobile stations, the base station reduces transmission power associated with the forward broadcast channel by a predetermined value. At most, transmission power associated with the forward broadcast channel may be reduced to a transmission power threshold or as noted above, nominally below the transmission power threshold due to margin of error. At step 430, the base station determines whether transmission power associated with the second communication resource is above the transmission power threshold. At step 440, the base station terminates transmissions to the plurality of mobile stations via the second communication resource in response to a failure to receive a transmission from the plurality of mobile stations via the first communication resource and a failure to detect transmission power associated with the second communication resource being above the transmission power threshold. In particular, the base station terminates transmissions to the plurality of mobile stations via the forward broadcast channel when there are no transmissions via either the reverse power request channel or the reverse traffic channel (i.e., no power request transmissions via the reverse power request channel and no voice and/or data transmissions via the reverse traffic channel) and when transmission power associated with the forward broadcast channel is no longer above (i.e., at or nominally below) the transmission power threshold. As a result, interference associated with the forward broadcast channel is terminated.

Many changes and modifications could be made to the invention without departing from the fair scope and spirit thereof. The scope of some changes is discussed above. The scope of others will become apparent from the appended claims.

What is claimed:

1. In a wireless communication system, the communication system providing communication services for a plurality of mobile stations, wherein the plurality of mobile stations are in communication with a base station via a first communication resource, and wherein the base station is in communication with the plurality of mobile stations via a second communication resource, a method for controlling power during a dispatch group call, the method comprising:

providing a power request authorization to at least one of the plurality of mobile stations based on a power requirement of each of the plurality of mobile stations;

monitoring for a transmission from the plurality of mobile stations via the first communication resource during a time period;

adjusting transmission power associated with the second communication resource based on the transmission from the plurality of mobile stations via the first communication resource;

determining whether the transmission power associated with the second communication resource is above a transmission power threshold; and terminating transmissions to the plurality of mobile stations via the second communication resource in response to a failure to receive the transmission from the plurality of mobile stations via the first communication resource during the time period and a failure to detect the transmission power associated with the second communication resource being above the transmission power threshold.

2. The method of claim 1, wherein monitoring for a transmission from the plurality of mobile stations via the first communication resource during a time period comprises monitoring for a power request transmission from one of the plurality of mobile stations during the time period.

3. The method of claim 2, wherein monitoring for the power request transmission from one of the plurality of mobile stations during the time period comprises monitoring for a power increase request access message (PIRAM) from one of the plurality of mobile stations via a reverse power request channel during the time period.

4. The method of claim 1, wherein monitoring for a transmission from the plurality of mobile stations via the first communication resources during the time period comprises monitoring for activity on a reverse channel during the time period.

5. The method of claim 1, wherein monitoring for transmission from the plurality of mobile stations via the first communication resource comprises monitoring for one of a voice transmission and a data transmission from one of the plurality of mobile stations during the time period.

6. The method of claim 1, wherein adjusting the transmission power associated with the second communication resource based on the transmission from the plurality of mobile stations via the first communication resource comprises decreasing the transmission power associated with the second communication resource by a predetermined value in response to a failure to receive a power request transmission from the plurality of mobile stations via the first communication resource.

7. The method of claim 1, wherein adjusting the transmission power associated with the second communication resource based on the transmission from the plurality of mobile stations via the first communication resource comprises adjusting the transmission power associated with the second communication resource to no less than the transmission power threshold.

8. The method of claim 1, wherein determining whether the transmission power associated with the second communication resource is above a transmission power threshold comprises determining whether the transmission power associated with a forward broadcast channel is above the transmission power threshold.

9. The method of claim 1, wherein determining whether the transmission power associated with the second communication resource is above a transmission power threshold comprises determining whether the transmission power associated with a forward broadcast channel is above the transmission power threshold in response to a failure to receive a power request transmission from one of the plurality of mobile stations via a reverse power request channel during the time period.

10. The method of claim 1, wherein terminating transmissions to the plurality of mobile stations via the second communication resource comprises terminating transmissions via a forward broadcast channel in response to a failure to receive one of a voice transmission and a data transmission from the plurality of mobile stations via a reverse traffic channel during the time period and a failure to detect the transmission power associated with the forward broadcast channel being above the transmission power threshold.

11. The method of claim 1, wherein the communication system comprises a code division multiple access (CDMA) based communication system.

12. In a wireless communication system, the communication system providing communication services for a plurality of mobile stations, wherein the plurality of mobile stations are in communication with a base station via a first communication resource, and wherein the base station is in communication with the plurality of mobile stations via a second communication resource, an apparatus for controlling power during a dispatch group call, the apparatus comprising:
- a receiving unit being operable to receive transmissions from the plurality of mobile stations via the first communication resource; and
- a controller operatively coupled to the receiving unit, the controller comprising a processor and a memory operatively coupled to the processor,
- the controller being programmed to provide a power request authorization to at least one of the plurality of mobile stations based on a power requirement of each of the plurality of mobile stations;
- the controller being programmed to monitor for a transmission from the plurality of mobile stations via the first communication resource during a time period,
- the controller being programmed to adjust transmission power associated with the second communication resource based on the transmission from the plurality of mobile stations via the first communication resource,
- the controller being programmed to determine whether the transmission power associated with the second communication resource is above a transmission power threshold, and the controller being programmed to terminate transmissions to the plurality of mobile stations via the second communication resource in response to a failure to receive the transmission from the plurality of mobile stations via the first communication resource during the time period and a failure to detect the transmission power associated with the second communication resource being above the transmission power threshold.

13. The apparatus of claim 12, wherein the first communication resource comprises one of a reverse power request access channel and a reverse traffic channel.

14. The apparatus of claim 12, wherein the second communication resource comprises a forward broadcast channel.

15. The apparatus of claim 12, wherein the transmission from the plurality of mobile stations comprises one of a power request transmission, a voice transmission, and a data transmission.

16. The apparatus of claim 15, wherein the power request transmission comprises a power increase request access message (PIRAM).

17. The apparatus of claim 15, wherein the power request transmission comprises a power request transmission associated with a mobile station with the highest transmission power requirement of the plurality of mobile stations.

18. The apparatus of claim 12, wherein the communication system comprises a code division multiple access (CDMA) based communication system.

19. In a wireless communication system for providing communication services for a plurality of mobile stations, wherein the plurality of mobile stations are in communication with a base station via a first communication resource, and wherein the base station is in communication with the plurality of mobile stations via a second communication resource, and wherein a processor operates in accordance with a computer program embodied on a computer-readable medium for controlling power during a group dispatch call, the computer program comprising:
- a first routine that directs the processor to monitor for a transmission from the plurality of mobile stations via the first communication resource during a time period, wherein the first routine comprises a routine that directs the processor to provide a power request authorization to at least one of the plurality of mobile stations based on a power requirement of each of the plurality of mobile stations;
- a second routine that directs the processor to adjust transmission power associated with the second communication resource based on the transmission from the plurality of mobile stations via the first communication resource;
- a third routine that directs the processor to determine whether the transmission power associated with the second communication resource is above a transmission power threshold; and
- a fourth routine that directs the processor to terminate transmissions to the plurality of mobile stations via the second communication resource in response to a failure to receive the transmission from the plurality of mobile stations via the first communication resource during the time period and a failure to detect the transmission power associated with the second communication resource being above the transmission power threshold.

20. The computer program of claim 19, wherein the first routine comprises a routine that directs the processor to monitor for a power request transmission from one of the plurality of mobile stations during the time period.

21. The computer program of claim 19, wherein the first routine comprises a routine that directs the processor to monitor for a power increase request access message (PIRAM) from one of the plurality of mobile stations via a reverse power request channel during the time period.

22. The computer program of claim 19, wherein the first routine comprises a routine that directs the processor to monitor for activity on a reverse channel during the time period.

23. The computer program of claim 19, wherein the first routine comprises a routine that directs the processor to monitor for one of a voice transmission and a data transmission from one of the plurality of mobile stations during the time period.

24. The computer program of claim 19, wherein the second routine comprises a routine that directs the processor to decrease the transmission power associated with the second communication resource by a predetermined value in response to a failure to receive a power request transmission from the plurality of mobile stations via the first communication resource.

25. The computer program of claim 19, wherein the second routine comprises a routine that directs the processor to adjust the transmission power associated with the second communication resource to no less than the transmission power threshold.

26. The computer program of claim 19, wherein the third routine comprises a routine that directs the processor to determine whether the transmission power associated with a forward broadcast channel is above the transmission power threshold.

27. The computer program of claim 19, wherein the fourth routine comprises a routine that directs the processor to determine whether the transmission power associated with a forward broadcast channel is above the transmission threshold in response to a failure to receive a power request transmission from one of the plurality of mobile stations via a reverse power request channel during the time period.

28. The computer program of claim 19, wherein the fourth routine comprises a routine that directs the processor to terminate transmissions via a forward broadcast channel in response to a failure to receive one of a voice transmission and a data transmission from the plurality of mobile stations via a reverse traffic channel during the time period and a failure to detect the transmission power associated with the forward broadcast channel being above the transmission power threshold.

29. The computer program of claim 19, wherein the communication system comprises a code division multiple access (CDMA) based communication system.

30. The computer program of claim 19, wherein the medium is one of paper, a programmable gate array, application specific integrated circuit, erasable programmable read only memory, read only memory, random access memory, magnetic media, and optical media.

31. In a wireless communication system, the communication system providing communication services for a plurality of mobile stations, wherein the plurality of mobile stations are in communication with a base station via a first communication resource, and wherein the base station is in communication with the plurality of mobile stations via a second communication resource, a method for controlling power during a dispatch group call, the method comprising:

storing a first transmission value and a second transmission value associated with each of the plurality of mobile stations, the first transmission value corresponding to a first transmission and the second transmission value corresponding to a second transmission from the respective mobile stations;

providing a power request authorization to one of the plurality of mobile stations based on the first transmission value and the second transmission value;

monitoring for a third transmission from the plurality of mobile stations via the first communication resource during a time period;

adjusting transmission power associated with the second communication resource based on the third transmission from the plurality of mobile stations via the first communication resource;

determining whether the transmission power associated with the second communication resource is above a transmission power threshold; and terminating transmissions to the plurality of mobile stations via the second communication resource in response to a failure to receive the third transmission from the plurality of mobile stations via the first communication resource during the time period and a failure to detect the transmission power associated with the second communication resource being above the transmission power threshold.

32. The method of claim 31, wherein storing a first transmission value and a second transmission value associated with each of the plurality of mobile stations comprises storing a first power request value and a second power request value associated with each of the plurality of mobile stations, the first power request value corresponding to a first power request transmission and the second power request value corresponding to a second power request transmission from the mobile station.

33. The method of claim 32, wherein providing a power request authorization to one of the plurality of mobile stations based on the first transmission value and the second transmission value from the mobile station comprises providing a power request authorization to one of the plurality of mobile stations based on the first power request value and the second power request value.

34. The method of claim 31, wherein providing a power request authorization to one of the plurality of mobile stations based on the first transmission value and the second transmission value comprises providing a power request authorization to a mobile station based on a linear prediction using the first transmission value and the second transmission value.

35. The method of claim 31, wherein adjusting transmission power associated with the second communication resource comprises increasing transmission power associated with a forward broadcast channel in response to receipt of a power request transmission from one of the plurality of mobile stations via a reverse power request channel, and wherein the transmission power associated with the forward broadcast channel is based on the power request transmission.

36. The method of claim 31, wherein adjusting the transmission power associated with the second communication resource comprises increasing transmission power associated with a forward broadcast channel in response to receipt of a power request transmission from the mobile station having the highest transmission power requirement.

37. The method of claim 31, wherein adjusting the transmission power associated with the second communication resource comprises increasing transmission power associated with a forward broadcast channel in response to receipt of a power increase request access message (PIRAM) from one of the plurality of mobile stations via a reverse power request channel, and wherein the transmission power is based on the PIRAM.

38. The method of claim 37, wherein increasing the transmission power associated with the forward broadcast channel in response to receipt of a PIRAM from one of the plurality of mobile stations via the reverse power request channel comprises increasing transmission power associated with the forward broadcast channel by a power increase associated with the PIRAM, and wherein the power increase comprises one of a $2\Delta$ power increase and a $\Delta$ power increase.

* * * * *